(12) United States Patent
Ringer et al.

(10) Patent No.: US 9,428,301 B1
(45) Date of Patent: Aug. 30, 2016

(54) USE OF CATHODIC COATINGS TO CAUSE SELECTIVE, RAPID DECAY OF SUBSTRATE METALS

(75) Inventors: Charles M. Ringer, San Diego, CA (US); Peyton W. Hall, San Diego, CA (US); Earl E. Floren, San Diego, CA (US)

(73) Assignee: The United States of America, as Represented by the Secretary of the Navy, Washington, DC (US)

( * ) Notice: Subject to any disclaimer, the term of this patent is extended or adjusted under 35 U.S.C. 154(b) by 1251 days.

(21) Appl. No.: 13/152,007

(22) Filed: Jun. 2, 2011

(51) Int. Cl.
*B63G 8/00* (2006.01)
*B65D 6/00* (2006.01)

(52) U.S. Cl.
CPC . *B65D 7/00* (2013.01); *B63G 8/00* (2013.01); *Y10S 220/30* (2013.01)

(58) Field of Classification Search
CPC ........ B65D 49/12; B65D 7/00; B60R 13/04; C23F 13/02; C23F 13/06; C23F 2213/30; C23F 2213/31; B63G 8/00; Y10S 220/30

USPC .......................................... 114/312
See application file for complete search history.

(56) References Cited

U.S. PATENT DOCUMENTS

| 3,629,091 | A | * | 12/1971 | George | B65D 7/00 204/248 |
| 3,830,634 | A | * | 8/1974 | Zaremski et al. | 204/196.18 |
| 6,209,816 | B1 | | 4/2001 | Hitomi et al. | |

* cited by examiner

*Primary Examiner* — Luan Van
*Assistant Examiner* — Alexander W Keeling
(74) *Attorney, Agent, or Firm* — SSC Pacific Patent Office; Arthur K. Samora; Kyle Eppele

(57) ABSTRACT

A self-destructive aquatic device for use in a water environment is formed with a body having a metallic portion and a covering preventing exposure of the metallic portion of the body from the water environment. A gap in the covering is used to expose the metallic portion of the body to the water environment. The covering has a cathodic property with respect to the metallic portion of the body, so that the gap and the covering establishing a cathodic-anodic ratio of areas exposed to the water environment to promote erosion of the metallic portion of the body in the water environment. This, in turn, results in controlled break-up of the aquatic device.

6 Claims, 2 Drawing Sheets

USE OF CATHODIC COATINGS TO CAUSE SELECTIVE, RAPID DECAY OF SUBSTRATE METALS

FEDERALLY-SPONSORED RESEARCH AND DEVELOPMENT

This invention is assigned to the United States Government. Licensing inquiries may be directed to Office of Research and Technical Applications, Space and Naval Warfare Systems Center, Pacific, Code 72120, San Diego, Calif., 92152; telephone 619-553-2778; email: T2@spawar.navy.mil. Reference Navy Case No. 100724.

BACKGROUND

This disclosure relates to controlled cathodic corrosion in aquatic environments.

SUMMARY

A self-destructive aquatic device is provided for use in a water environment. The aquatic device includes a body having a metallic portion and a covering for the metallic portion. The coating prevents exposure of the metallic portion of the body to the water environment. In one configuration, the coating comprises a metallic coating portion exposed to the water environment and is in electrical communication with the metallic portion of the body, and at least one gap in the covering exposes the metallic portion of the body to the water environment. The gap and the covering establish a cathodic-anodic ratio of areas exposed to the water environment to promote erosion of the metallic portion of the body in the water environment to cause the aquatic device to self-destruct.

DETAILED DESCRIPTION

Figure 1:
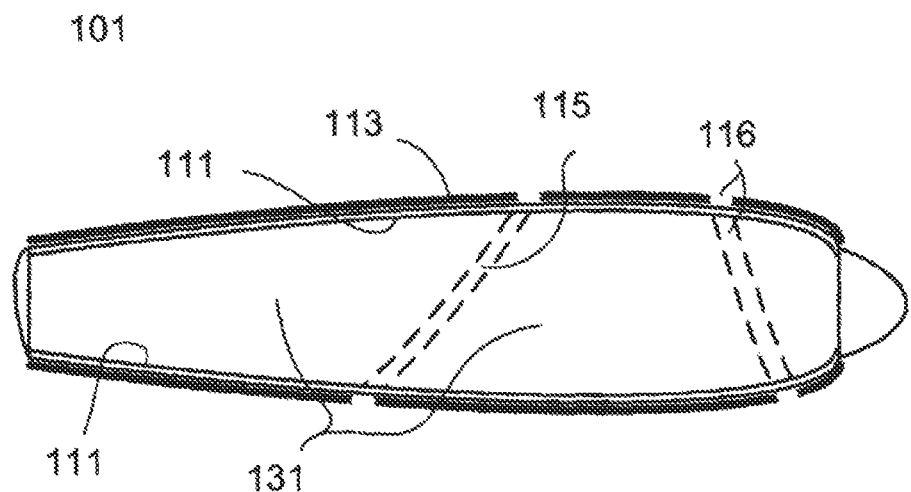
FIG. 1 is a diagram showing a structure in which an aquatic device has a metal body coated with a cathodic material.

Aquatic devices of various types are often used in a manner which can cause them to remain in the aquatic environment after their useful life. This is desired for a variety of reasons, ranging from the device becoming detached from its mooring to devices which are deployed in a manner which would require significant effort at retrieval. Devices which remain in the aquatic environment can cause shipping hazards or otherwise cause undesired results if allowed to remain in place after their useful life. If the device is made of materials which are non-toxic in the aquatic environment, it is desirable that they be allowed to decay. In doing so, it is desired that the device maintain integrity during its useful life, and then, after its useful life, disintegrate quickly.

Galvanic corrosion control in an aquatic environment is fairly common, at least in the respect of providing a sacrificial anode for aquatic equipment. In a typical embodiment, an active metal such as magnesium is placed in electrical communication with a structure which is to be protected. These arrangements are intended to prevent corrosion of the actual equipment. Galvanic activity is described in terms of electrochemical potential ($\bar{\mu}$), expressed in the unit of J/mol.

The disclosed technique is intended to allow an aquatic device to passively break apart. In the case of devices utilizing metallic pressure vessels, the pressure vessel and the internal electronics tray equipment break apart, and are allowed to disintegrate or break apart after scuttling. The scuttle function as described can be either an intentional scuttle based on anticipated use of the device, or an unintentional scuttle such as occurs after the aquatic device is lost due to flooding or other failure. In both intentional and unintentional cases, the device harmlessly decays.

The techniques could be used to cause any submerged metallic system to break apart in a designed fashion. Such metallic systems include, without limitation, oceanographic equipment, sensors, fishing equipment, and oil field equipment.

Galvanic decay occurs when metallic materials in which there is a separation on the standard electrical potential, are coupled, thereby establishing an anodic and cathodic metallic material. The galvanic action occurs when the materials are also exposed to a conductive electrolyte and the materials are directly or indirectly in electrical contact with each other. The electrical contact of the materials and the conductive electrolyte complete a galvanic circuit, although it is also possible to achieve the electrical communication between the anode and cathode by an intermediate connection. The more anodic metal will experience an increased rate of corrosion decay, relative to if it was electrically isolated from the more cathodic metal.

In the case of alloyed materials, there is direct relevance to the proposed invention, as they provide for a means of creating galvanic cells distributed throughout the material. In this instance, there would have to be a corrosion potential that exists between the elements that are being used in an alloy. For example, Aluminum that has been alloyed with copper, or iron which has been alloyed with graphite (carbon). In these cases, the greater the quantity of copper or carbon, relative to aluminum or iron, the greater the theoretical rate of corrosion. It is possible to provide an alloy that comprises both a material based means of enhancing decomposition through galvanic cells in the material and good mechanical properties.

"Metal" and "metallic", as used herein, is intended to describe materials that behave as metals in a galvanic sense. Metals can include metals and metal alloys such as iron, copper, magnesium and aluminum, and materials that galvanically behave as metals such as carbon. Metals can also include compounds that have galvanic metallic properties, such as $CuSO_4$ and which exhibit an electrochemical potential similar to metal and suitable for establishing galvanic action. The galvanic activity of the materials is expressed in terms of an anodic index, with lower numbers being relatively cathodic as compared to materials having a higher anodic index. Alternatively, the galvanic activity of materials is expressed in terms of potential with respect to a reference, such as potential in a neutral pH environment with respect to a Cu: $CuSO_4$ reference material, with more negative potential values representing relatively anodic materials and more positive values representing relatively cathodic materials.

The described techniques can be used to cause an aquatic device to selectively decay and then fall apart into discrete sections, in a known and quantifiable fashion along designed pathways.

FIG. 1 is a diagram showing a structure in which an aquatic device 101 has a metal body 111 coated with a cathodic material 113. Depicted are one or more gaps 115, 116 formed by openings or exposed regions in the cathodic material 113 where the metal body 111 is exposed. Aquatic device 101 can be placed in any aquatic environment suitable for the particular aquatic device. For purposes of explanation, "sea water" will be described; however, other types of water are suitable, provided that the difference in electrolytic properties is taken into consideration.

Given that the electrolyte characteristics of sea water are generally predictable, it is possible to configure a gap 115 to cause metal body 111 to galvanically erode within controlled limits, thereby establishing a weak point in metal body 111. Metal body 111 forms an anodic substrate material, whereas the outer material 113 forms a cathodic element. The galvanic action is controlled by the relative areas of the cathodic material 113 which is exposed to sea water, as compared to the area of gaps 115, 116. The cathodic material 113 may be separated from metal body 111, provided that there is an electrical connection between the cathodic material 113 and metal body 111. If the cathodic material 113 is separate from metal body 111, it is also necessary to include any regions of metal body exposed to sea water in the determination of area exposed to galvanic action. While the dimensions of the exposed material at gaps 115, 116 will vary as the body material at the gaps erode, this erosion remains controlled until the body 111 perforates. At that time, aquatic device floods, exposing an inside portion 131 to sea water, increasing the rate of erosion.

By way of non-limiting example, anodic substrate material, such as aluminum, is plated with a more cathodic material such as nickel, silver, or platinum to form outer material 113. The relative effect of coating type on the rate of corrosion is relatively mild. As a result, it is possible to focus on the use of inexpensive nickel coatings over an aluminum substrate.

Figure 2:
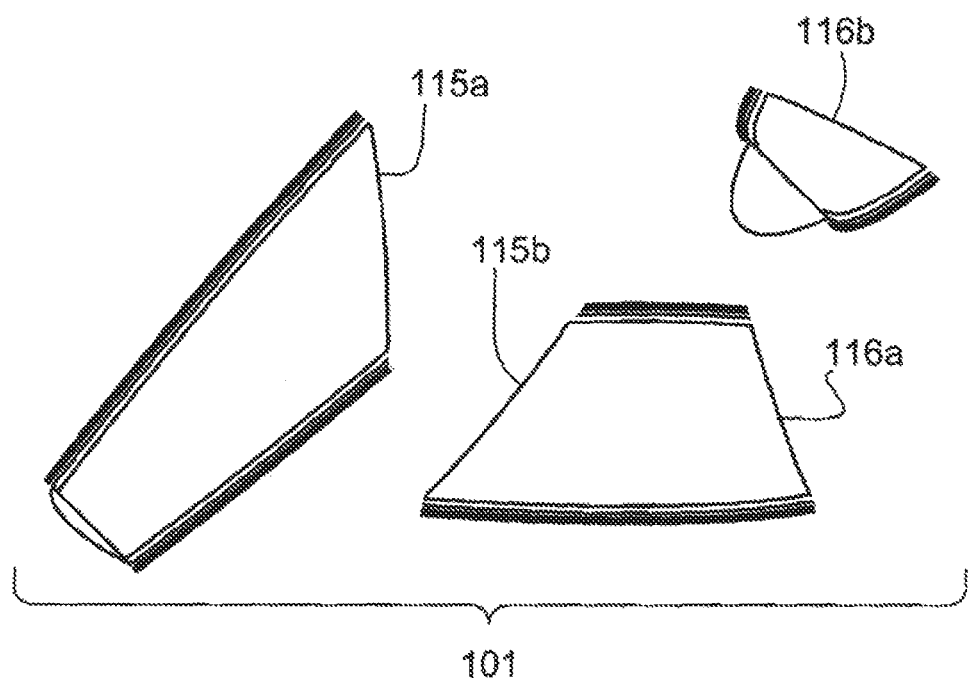
FIG. 2 is a schematic diagram of aquatic device having broken up after erosion as a result of galvanic activity.

FIG. 2 is a schematic diagram of aquatic device 101 having broken up after erosion along gaps 115, 116 (FIG. 1) to form fracture lines 115a, 115b, 116a, 116b. By way of non-limiting example, the configuration of gaps 115, 116 is such that the erosion takes place in a manner to cause the aquatic device 101 to break up in a desired manner or according to a desired pattern. In some cases, this allows aquatic device to quickly sink, although it is contemplated that portions of aquatic device may be allowed to float while permitting other portions of the aquatic device to sink. In the case of the portions sinking, aquatic device 101 will continue to erode, while at the same time, internal components (not shown) would be exposed to the sea water. Portions of the internal components can be designed to rapidly deteriorate in sea water once exposed to sea water.

Figure 3:
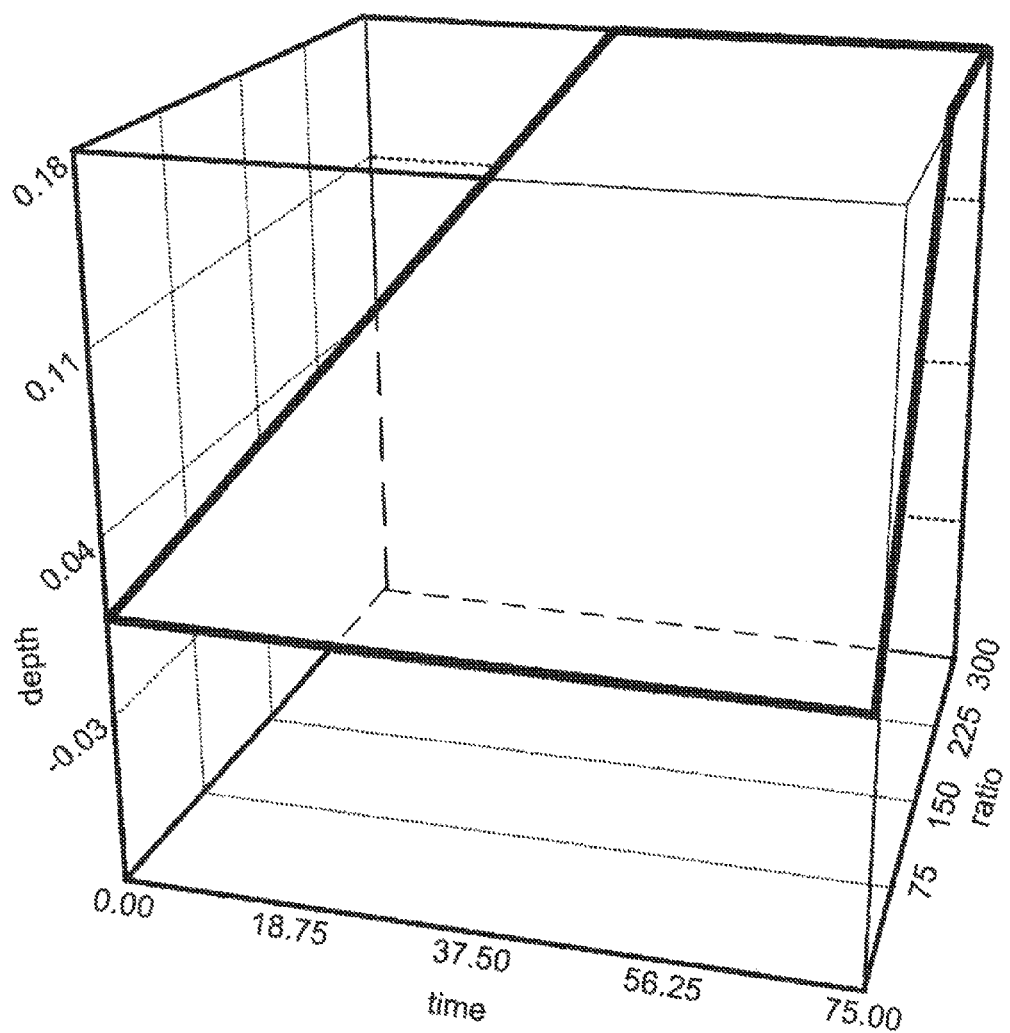
FIG. 3 is a graphical depiction of the relationship between cathode/anode ratio, time and depth of erosion.

FIG. 3 is a graphical depiction of the relationship between cathode/anode ratio, time and depth of erosion. As can be seen, as a ratio between the total surface area and the anodic material exposed at gaps 115, 116 (FIG. 1) increases in favor of the total surface area, the rate of erosion of the anodic material increases. This increase bears an inverse logarithmic relationship to the ratio. Thus erosion increases according to the cathodic area or the narrowness of gaps 115, 116, but according to the inverse logarithmic relationship. The ratios of cathode to anode are described by the surface. In this case, we are looking at cathode to anode area ratios which vary from between 10:1 and 300:1. The graph itself depicts the relationship between time, depth of corrosion, and cathode to anode surface area ratios. Because time and cathode to anode surface area ratios are the causal factors we were evaluating, they are used on the independent axis This allows timing of the erosion, so that the erosion occurs after an anticipated useful life of the underwater device.

It is possible to describe galvanic action in terms of electrolyte, e.g., of the sea water; however, it would require an additional axis (4th axis on the plot). A general way of describing the effect of the electrolyte is to say that, for a galvanic cell to exist, there must be a conductive pathway between the two elements of the galvanic cell. The better the electrical conductivity—to an extent—the better the cell will function. The calculations do not take into account salinity of the water as they were all conducted in the same location (constant salinity). While galvanic action is active in oceanic sea water, and is most predictable in oceanic sea water, the techniques can also be used in fresh and brackish water. Within the ocean, salinity falls into a fairly narrow range; however, in other environments, including littoral waters, salinity could have a significant effect on the rate of corrosion.

The effect of the electrolyte is that it serves as a conductive pathway between two dissimilar metals. Ultimately, the more conductive the electrolyte, the more effective the cell. In the examples given, the conductive pathway is provided by seawater. Other electrolytic solutions would work as well, such as freshwater (not distilled), and any other solutions that are electrically conductive. The cathode to anode area ratio, for any given aquatic environment, controls the depth of corrosion over time.

Referring again to FIG. 1, the gap in the coating forming cathodic material 113 allows for the decay of metal body 111, which forms the anodic substrate material. By way of non-limiting example, the metal body can be provided as aluminum, with the coating provided as nickel plate. In order to form gaps 115, 116, an initial preparation of the aluminum follows a nickel plating process; however, prior to submersing metal body 111 in a nickel plating bath (not shown), a silk screen print is used to apply a liquid masking compound in a pre designed pattern to metal body 111. The effect of this masking compound is that the nickel does not bond to the aluminum in the masked regions so that once metal body 111 is removed from the plating bath there are exposed strips of metal body 111, which forms the anodic metal.

The advantage of this silk screening process is that it can be optimized to produce a very high ratio of cathode to anode. This is a desirable characteristic as it leads to decay occurring in a more rapid fashion. The silk screening process allows anode to cathode area ratios in excess of 300 to be used.

In addition to silk screening, other selective coating techniques can be used. Masking tape, applied prior to plating can be used, as well as masking liquid or paint, such as "liquid latex" masking fluid. The masking liquid acts as a film which prevents the adherence of the cathodic plating. Another selective coating technique uses a masking device, which is a device that fully encapsulates the part to be masked, and through physical contact prevents the cathodic material from depositing on selected surfaces of the body. It is also possible to fully plate the body in the cathodic coating, and then subsequently removing selected areas of the coating through ablation.

It is possible to allow a partial plating to occur at the gaps, for example by initial electroplating prior to silk screening. The partial plating can be used to allow an erodible material to be layered across the gaps, thereby delaying the start of anodic erosion of metal body 111. This allows metal body 111 to retain structural integrity for a period of time during which the partial plating erodes. By way of non-limiting example, the partial plating can include a material which is more anodic than the cathodic material 113, so that the erosion of the partial plating can precede erosion of metal body 111 in a predictable time period.

When the aquatic device 101 is deployed in sea water, a galvanic cell forms between metal body 111 forming the anodic substrate, and the cathodic coating material 113. The anodic substrate decays at a rate which is proportional to the amount of exposed anode, and the surface area of the cathodic coating, which bears an inverse logarithmic relationship to the areas as described above. Those remaining components of undersea device 101 which fall to the bottom of the body of water will eventually corrode or remain in place.

It is also possible to provide a metallic body in which weak points in the cathodic coating are contained inside of the vessel. These weak points will not be exposed until such time as the vessel is flooded with water/electrolyte. While it is intended that the metallic area be exposed by the flooding, it may be desired to prevent this from decreasing the cathode to anode area ratio. One technique of preventing a decrease in the cathode to anode area ratio would be to have the inside portions of the items fully plated with the cathodic coating, such that upon flooding, additional coating is further exposed to the water environment. By increasing the cathode to anode ratio, an accelerated degree of galvanic erosion can be generated.

While galvanic activity between the coating forming the cathodic material 113 and the metal body 111 is described, it is also possible to configure a covering for the metallic portion of the body 111 with a covering comprising a nonmetallic coating portion exposed to the water environment. This would be as depicted in FIG. 1 at 113, except that coating 113 would be non-metallic. Non-limiting examples of such coatings would include anodizing, painting and non-curing organic coatings. If desired, it is possible to also include exposed cathodic coatings, which would be either on the exterior or interior of the body 111. Non-metallic coatings would not increase the rate at which the corrosion occurs to the same extent as a bi-metallic coupling resulting from exposure of a cathodic coating; instead, these coatings would act to target specific areas.

Non-metallic coatings can be formulated to deteriorate in seawater. If the non-metallic coating is layered over a cathodic coating, then the erosion sequence would be that the coating would first erode or deteriorate, followed by acceleration of galvanic corrosion as a result of exposure of a cathodic coating. As mentioned above, cathodic coatings on the inside of the body would accelerate galvanic corrosion after the inside is flooded. The non-metallic coating can be applied to cover the body to decrease corrosion at an initial stage, followed by accelerated erosion upon breach of the gap. Alternatively, the non-metallic coating can be applied to cover the body, including the gap. In this arrangement, the non-metallic coating would decrease corrosion at an initial stage, followed by accelerated erosion upon deterioration of the non-metallic outer cover.

While aquatic device 101 has been described as self-destructing, it is also possible to configure a portion of an aquatic device to remain intact after the galvanic erosion. This can be used, for example, when an aquatic device includes a first apparatus that is used to position the aquatic device, but the first apparatus is no longer used after deployment.

It will be understood that many additional changes in the details, materials, steps and arrangement of parts, which have been herein described and illustrated to explain the nature of the invention, may be made by those skilled in the art within the principle and scope of the invention as expressed in the appended claims.

What is claimed is:

1. A self-destructive aquatic device comprising:
   a submersible body comprising a metallic portion;
   a covering for the metallic portion of the submersible body, the covering comprising a metallic coating portion that is adapted to be submersed in an electrolyte for a predetermined period of time at a predetermined depth, the metallic coating portion in electrical communication with the metallic portion of the submersible body; and
   at least one gap in the covering permitting the exposure of the metallic portion of the submersible body to the electrolyte for the predetermined period of time at the predetermined depth, wherein each at least one gap delimits one discrete separable section of the submersible body from another discrete separable section of the submersible body;
   wherein when the covering and the at least one gap are submersed in the electrolyte for the predetermined period of time at the predetermined depth, a ratio of a surface area of the covering to a surface area of the at least one gap defines a cathodic-anodic ratio of areas submersed in the electrolyte of between 10:1 and 300:1 to control erosion of the metallic portion of the submersible body such that the submersible body corrodes into a predetermined plurality of independent sections at a predetermined time to cause the aquatic device to self-destruct along the at least one gap such that each said discrete separable section of the submersible body separates from each other said discrete separable section of the submersible body.

2. The aquatic device of claim 1, wherein the gap in the covering establishes a weak portion of the submersible body permitting erosion to cause the aquatic device to structurally fail in a desired manner.

3. The aquatic device of claim 1, whereby the erosion of the metallic portion of the submersible body results in a perforation of a containment established by the submersible body, the perforation of the containment results in further exposure of the metallic portion of the submersible body to the water environment by allowing sea water to enter an internal portion of the submersible body.

4. The aquatic device of claim 1, wherein the covering for the metallic portion of the submersible body comprises electroplated material having an outer layer that is electronegative relative to the metallic portion of the submersible body.

5. The aquatic device of claim 1, further comprising:
   a non-metallic outer layer covering for the submersible body wherein the non-metallic covering decreases corrosion at an initial stage, followed by accelerated erosion upon breach of the gap.

6. The aquatic device of claim 1, wherein the gap forms a pattern of intended erosion of the metallic body, thereby causing the aquatic device to structurally fail according to the pattern.

* * * * *